Jan. 15, 1935.  T. J. MORAN  1,988,044

ICE CREAM CONTAINER ATTACHMENT

Filed May 11, 1934

Inventor

Thomas J. Moran

By Clarence A. O'Brien

Attorney

Patented Jan. 15, 1935

1,988,044

UNITED STATES PATENT OFFICE 1,988,044

ICE CREAM CONTAINER ATTACHMENT

Thomas J. Moran, Chicago, Ill.

Application May 11, 1934, Serial No. 725,220

4 Claims. (Cl. 220—85)

The present invention relates to new and useful improvements in ice cream container attachments for use in cabinets of the usual type including one or more compartments which receive the containers in spaced relation thereto and has for one of its important objects to provide an attachment comprising a novel construction through the medium of which the container will be firmly retained against movement while the ice cream is being dipped therefrom, the invention being intended particularly for use in connection with the comparatively light paper containers which are coming into widespread use at present, although, of course, the invention may be used with any type of container for which it may be found adapted.

Another very important object of the invention is to provide an attachment of the aforementioned character which will effectively close the space between the container and the compartment wall, thereby preventing the entrance of air from the atmosphere.

Other objects of the invention are to provide an attachment of the character described for ice cream containers which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1:
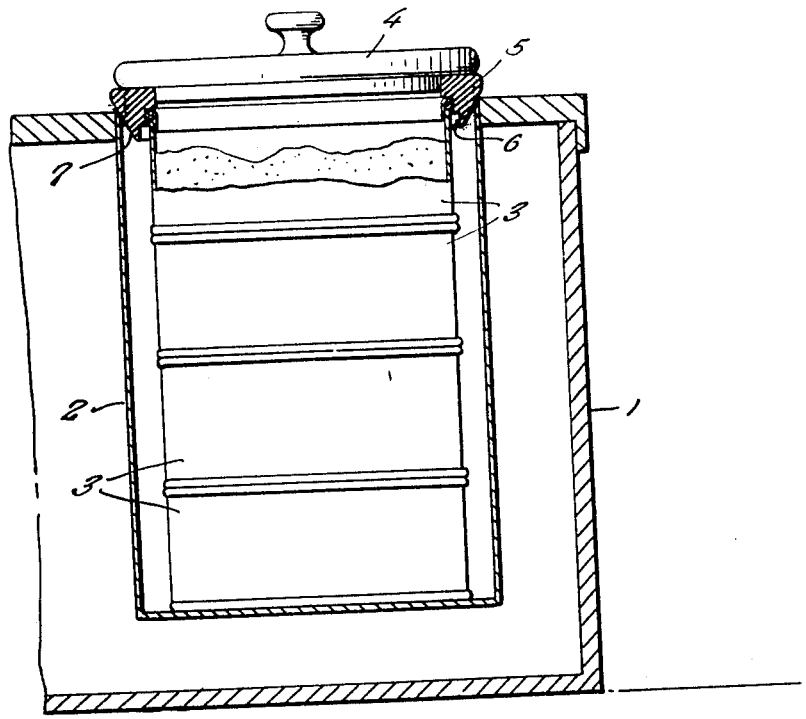
Figure 1 is a view in vertical section through a portion of an ice cream cabinet, showing an attachment in accordance with the present invention mounted therein.
Figures 2, 3:
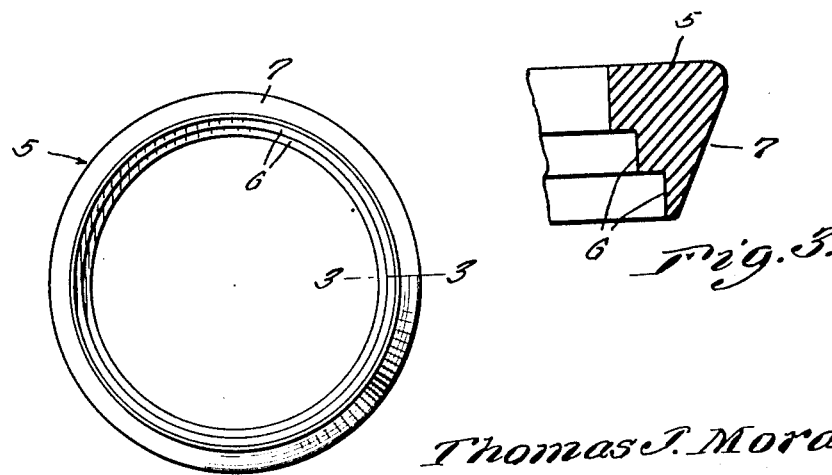
Figure 2 is a view in bottom plan of the invention.
Figure 3 is a sectional view on an enlarged scale, taken substantially on the line 3—3 of Figure 2.

Referring now to the drawing in detail, it will be seen that the reference numeral 1 designates a portion of an ice cream cabinet of conventional construction having a compartment 2 therein. The compartment 2 receives, in the usual manner, one or more containers 3, those illustrated in Figure 1 of the drawing being of the paper type. It will be noted that the walls of the compartment 2 are spaced from the containers 3, as usual. The reference numeral 4 designates a top for the uppermost container 3 which, of course, is open to permit the ice cream to be dipped therefrom.

The embodiment of the present invention which has been illustrated comprises a resilient, compressible, annular gasket 5 of suitable material, preferably rubber, which is adapted to be wedged between the top portion of the compartment 2 and the upper portion of the uppermost container 3 in the manner illustrated to advantage in Figure 1 of the drawing. To this end the gasket 5 is formed to provide a stepped inner periphery 6 for the reception of containers of different diameters or sizes and a tapered or conical outer periphery 7 which is engageable with the compartment 2, as will be understood.

In use, the gasket 5 is pressed downwardly between the compartment 2 and the uppermost container 3, the top of said uppermost container seating in one of the recesses or rabbets 6. When thus pressed into position the gasket 5 effectively closes and seals the space between the containers 3 and the compartment 2 for preventing the entrance of air from the atmosphere, said gasket 5 being compressed and frictionally engaged with the compartment 2. Also, the gasket 5 firmly secures the container from which the ice cream is being dipped against movement by friction. As best seen in Figure 1 of the drawing, the cover 4 of the ice cream cabinet is mounted on the gasket 5.

It is believed that the many advantages of an ice cream container attachment constructed in accordance with the present invention will be readily understood, and although a preferred embodiment of the invention is as illustrated and described, it is to be understood that changes in the details of construction may be resorted to which will fall within the scope of the invention as claimed.

What is claimed is:—

1. A gasket comprising an annulus of substantially triangular cross section including a plurality of steps of different diameters in its inner periphery for the reception of container tops of various sizes.

2. A gasket comprising an annulus of compressible material including a substantially tapered inner periphery including a plurality of steps of different diameters therein for the reception of container tops of various sizes.

3. In combination with an ice cream cabinet comprising a compartment for the reception of a container in spaced relation thereto and a cover for said compartment, a compressible annulus of substantially triangular cross section engageable between the container and the compartment and rising thereabove for receiving the cover thereon, said annulus including a plurality of steps of different diameters in its inner periphery for the reception of the top portions of various sizes of containers.

4. A gasket comprising a substantially flat body having an opening therethrough, the walls of said opening having continuous, progressively offset recesses therein for the reception of the top portions of various sizes of containers.

THOMAS J. MORAN.